April 3, 1928.  1,665,100

H. KLAUCKE

PIN RETAINING MEANS FOR CHAINS

Filed Dec. 13, 1926

Inventor
Hermann Klaucke
By Attorneys
Southgate Fay & Hanby

Patented Apr. 3, 1928.

1,665,100

UNITED STATES PATENT OFFICE.

HERMANN KLAUCKE, OF WORCESTER, MASSACHUSETTS, ASSIGNOR TO BALDWIN CHAIN & MFG. CO., OF AUBURN, MASSACHUSETTS, A CORPORATION OF MASSACHUSETTS.

PIN-RETAINING MEANS FOR CHAINS.

Application filed December 13, 1926. Serial No. 154,373.

This invention relates to a device for retaining the cross pins which connect the links of chains which are subjected to hard service and takes the place of an ordinary cotter pin. It is found in practice that the cotter pins ordinarily used, being of soft metal, are easily broken and worn off, thus allowing the chain to come apart.

The principal object of this invention is to provide a retaining means of comparatively inexpensive construction which will serve every purpose of a cotter pin and will not shear off under hard service and to provide the pin portion thereof with a surrounding cup which will protect the pin from injury and at the same time provide a positive lock for the pin and also act as a washer. The invention also involves a construction in which the chain links are readily detachable for repairs and replacement and are easy to assemble. Other objects and advantages of the invention will appear hereinafter. Reference is to be had to the accompanying drawings in which Fig. 1 is a plan of a chain with a preferred embodiment of this invention applied thereto, one cross pin and connected parts being shown in central section;

Figure 1:
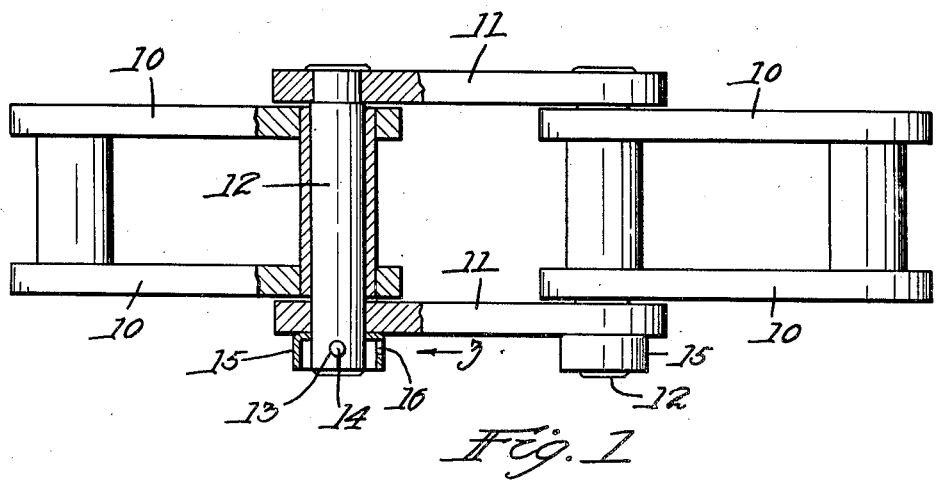

In the form of the invention shown in the drawings, the chain links 10 are connected with the outer chain links 11 by cross pins 12 of well known type, these cross pins being perforated at 13. Through the perforations 13 is placed a plain pin 14 of high grade steel so as to avoid the wear to which ordinary cotter pins used in this place are subjected. This pin 14 is a single pin extending through the pivot pin only a short distance on each side.

Figure 3:
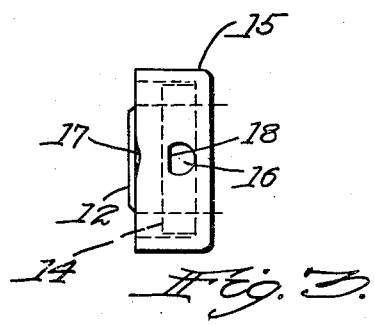
Fig. 3 is an elevation of one pin retaining devices.

To protect this pin and hold it in position and also constitute a washer, I provide a pin retaining cup 15, the flat bottom of which is located between the pin and the chain link so that it constitutes a washer and the cylindrical side wall of which is provided with a radial perforation 16. This perforation is originally round and the bottom of the cup is tangent to it. It is employed for the introduction of the pin 14. After the pin is introduced through the perforation 16 into the cross pin 12, the cup-shaped protecting member 15 is turned a little and then pressure, either by hammer or other means, is applied to force in the wall of the perforation 16 so that it will not allow the pin 14 to be withdrawn through it. In Fig. 3 I have shown this in the form of an indentation 17 and a depression 18 at one side of the round perforation 16. Any distortion of the perforation can be employed.

Figure 2:
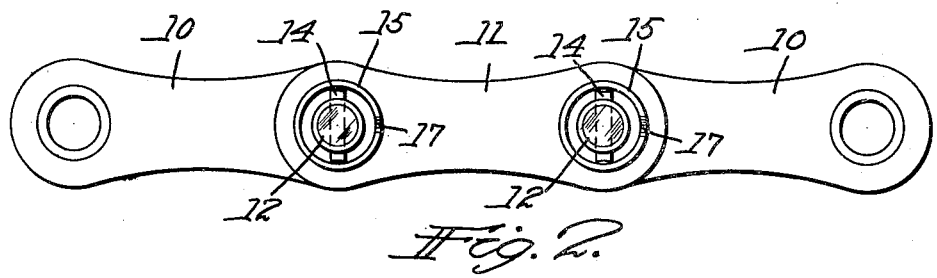
Fig 2 is an edge view of the same.

From that time on the cup is capable of turning freely on the cross pin 12 and the holding pin 14 cannot possibly be dislodged, because the cup is centered and the pin projects into the cup from both sides of the pin 12 as will be seen from Fig. 2. The fact that this cup can rotate reduces the wear considerably as it does not have to scrape along a surface with which it may come in contact. It will be obvious that it also serves as a washer and that it fully protects the pin 14 from injury and prevents its loss by displacement. Therefore, the pins 14 cannot be sheared off under hard service and their injury is comparatively unlikely.

The protection of the pin in such a way constitutes a great saving in the use of heavy chains for various purposes particularly in the oil districts. The loss of time from stopping of some of these chains, owing to the cutting or wearing of the usual cotter pin, is avoided, thus providing another important saving. The means shown allow the use of an alloy steel pin in an inexpensive way. This is something that cannot be done very well with the ordinary cotter pin because it is difficult to make them from alloy steel.

I am aware of the fact that the invention can be carried out in other forms without departing from the scope thereof as expressed in the claims. Therefore, I do not wish to be limited to the exact form shown but what I do claim is:

1. As an article of manufacture, a holding device for a cross pin of a link chain, comprising a cup-shaped member having a flat uninterrupted bottom adapted to engage the surface of one of the links and having a perforation through the bottom for the cross pin on which it is freely rotatable, and a holding pin extending through the cross pin and located in the cup-shaped member at a distance below the edge thereof, the cup-shaped member being centered on the cross pin.

2. As an article of manufacture, a protecting device for a pin for holding a chain cross pin in position, consisting of a cup-shaped member having a bottom provided with a central opening for receiving the cross pin and centering the cup-shaped member thereon, said cup-shaped member extending outwardly substantially flush with the end of the cross pin and having an opening therein for receiving a holding pin, said opening thereafter being distorted to prevent the holding pin from getting out of the cross pin through this opening.

In testimony whereof I have hereunto affixed my signature.

HERMANN KLAUCKE.